United States Patent [19]

Kjaergaard

[11] 4,044,792

[45] Aug. 30, 1977

[54] DIAPHRAGM OPERATED PRESSURE REGULATOR

[75] Inventor: Knud Kjaergaard, Ballerup, Denmark

[73] Assignee: Odin Clorius A/S, Kovlunde, Denmark

[21] Appl. No.: 691,081

[22] Filed: May 28, 1976

Related U.S. Application Data

[63] Continuation-in-part of Ser. No. 588,338, June 19, 1975, abandoned.

[51] Int. Cl.² ............................................. F16K 31/12
[52] U.S. Cl. ............................ 137/505.22; 137/505.23
[58] Field of Search ...................... 137/505.21, 505.22, 137/505.23, 505.41

[56] References Cited

U.S. PATENT DOCUMENTS

| | | | |
|---|---|---|---|
| 323,364 | 7/1885 | Ptovdler | 137/505.22 |
| 697,680 | 4/1902 | Singer | 137/505.22 X |
| 2,147,850 | 2/1939 | MacLean | 137/505.41 X |

*Primary Examiner*—Harold W. Weakley

[57] ABSTRACT

A pressure regulator for regulating valves and other pressure-reducing mechanisms having control means including a stem which is actuated to close the valve or mechanism by means of a diaphragm built into the pressure regulator. The side of the diaphragm opposite the stem is subjected to the reduced pressure on the downstream side of the valve or mechanism and is biased by a force, e.g. a spring force, which balances the reduced pressure. The stem of the control means is passed through a safety slide member axially movable in the housing of the pressure regulator, and the stem is provided with a locking ring at a point between the slide member and the end wall of housing of the pressure regulator, corresponding to the predetermined lift.

3 Claims, 1 Drawing Figure

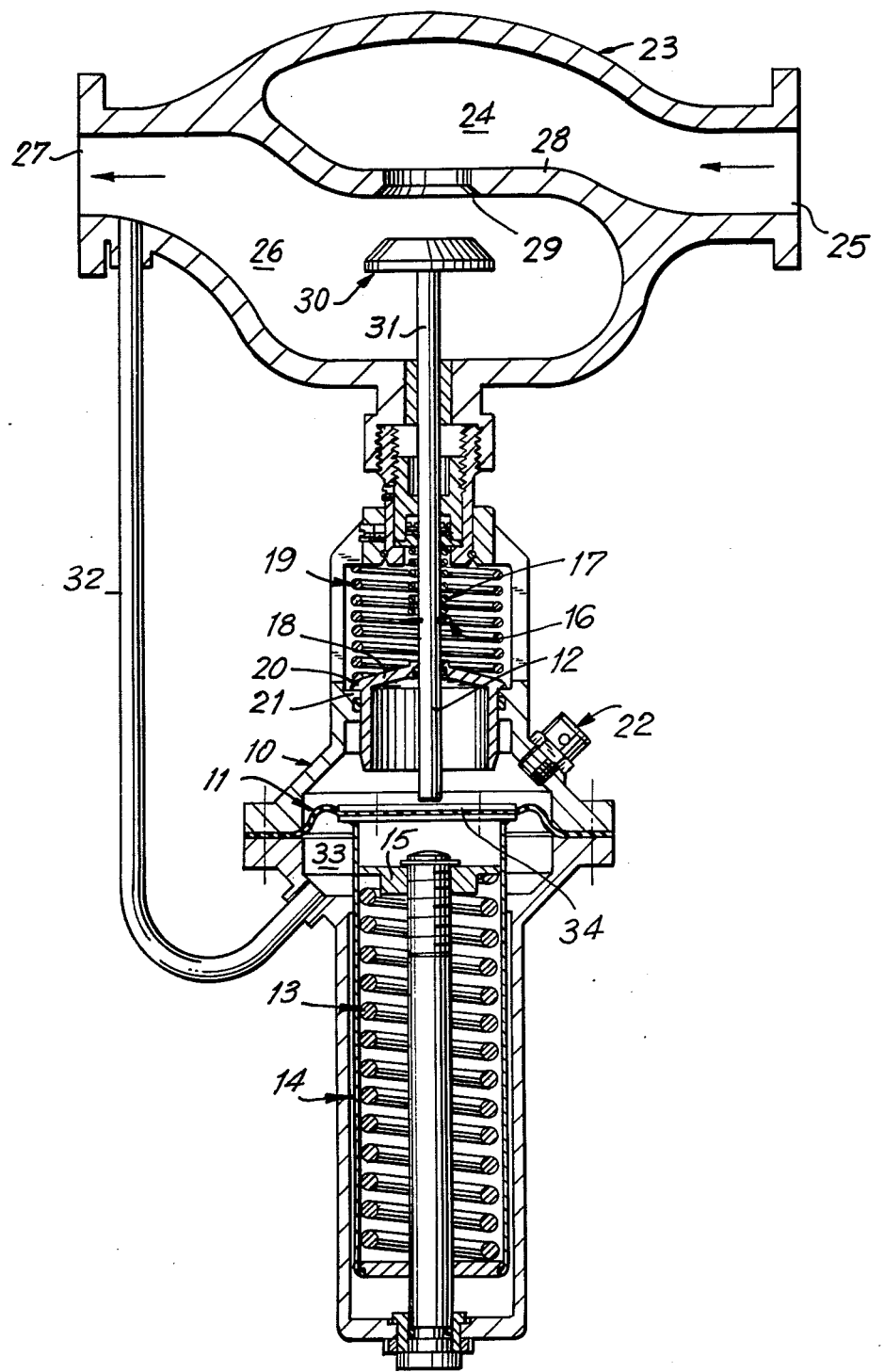

DIAPHRAGM OPERATED PRESSURE REGULATOR

This is a continuation-in-part application of Ser. No. 588,338, filed on June 19, 1975, now abandoned.

FIELD OF THE INVENTION

The present invention relates to a pressure regulator for regulating valves and other pressure-reducing mechanisms whose control means includes a stem which is actuated to close the valve or mechanism by means of a diaphragm built into the pressure regulator, where the side of the diaphragm opposite the stem is subjected to the reduced pressure on the downstream side of the valve or mechanism and is biased by a force, e.g. a spring force, which balances the reduced pressure.

DESCRIPTION OF THE PRIOR ART

Pressure regulators of this type are used, e.g., for hot-water district heating plants operating at high pressures and where for reasons of safety it is undesirable to feed fluid under high pressure from the distributing network into blocks of flats or into other consumers' locations. The pressure regulator is then connected to a main regulating valve, and a capillary tubing will guide the reduced pressure fluid following the valve to the lower side of the diaphragm, the regulator being usually suspended from the regulating valve. An increase in pressure of the reduced pressure fluid will urge the diaphragm and therefore also the stem upwardly, and reduce the opening of the regulating valve so as to restore the former state.

Pressure regulators of this type have the disadvantage that a leak in, or rapture of the diaphragm could be disastrous, as the pressure on the lower side of the diaphragm will be equalized by the leak, and the spring force otherwise balancing the pressure will then cause the regulator to open the regulating valve completely, so that the full delivery pressure from the district heating network is transmitted to the local plant, exposing it to the danger of bursting.

OBJECT OF THE INVENTION

It is an object of the present invention to obviate this disadvantage.

SUMMARY OF THE INVENTION

To achieve this object, the pressure regulator, according to the invention, is characterized by passing the stem of the control means through a safety slide member axially movable in the housing of the pressure regulator, and by providing the stem with a locking ring at a point between the slide member and the end wall of the housing of the pressure regulator, corresponding to the predetermined lift.

Should the diaphragm become defective, the pressure on the upper side of the diaphragm will increase and thereby cause the safety slide member to engage the locking ring of the stem and simultaneously move the latter so as to urge the regulating valve towards its closing position. When the pressure on the lower side of the slide member, and the mechanical forces acting on the top of the slide member have been equalized, the regulating valve will be closed to the extent that the fluid under high pressure in the district heating system is prevented from being transmitted to the local plant. Hence, the inlet is not completely shut off, so that a minimum supply is maintained until repairs are possible. This minimum supply may be predetermined, according to the invention, by means of springs actuating the slide member which are preferably adjustable.

BRIEF DESCRIPTION OF THE DRAWINGS

The invention will be further explained below with reference to the drawing, which is a part sectional view of a throttle valve controlled by means of an embodiment of the pressure regulator, according to the invention.

DESCRIPTION OF THE PREFERRED EMBODIMENT

The pressure regulator illustrated includes a housing 10 including a diaphragm 11. The space below the diaphragm communicates through a tubing 32 of small diameter with a side of a throttle valve (23), more specifically the downstream flow direction side 26 of the throttle valve.

The valve, which may be a valve for connecting a central heating system of a block of flats to a district heating plant using hot water, is disposed above the pressure regulator, clamped to its housing 10, and includes a control means actuable by a stem 12, whose lower end engages the upper side of the diaphragm 11.

The pressure present on the lower side of the diaphragm 11 will seek to arch the diaphragm upwardly as shown, and this deformation is opposed by a compression spring 13 disposed below the diaphragm and interposed between a spring holder 14 descending from the diaphragm, and a top 15 affixed to the regulator housing.

A locking ring 16 is secured to the stem 12 in the regulator housing, and a light spring 17 disposed between the locking ring 16 and the top end wall of the regulator housing is seeking to maintain the lower end of the stem in engagement with the diaphragm 11. The stem is adapted to slide through a safety slide member formed as a piston 18, which is held by means of a light force compression spring 19 and a flange 20 against an annular projection 21 in the housing. The seal between the housing and the piston, and between the piston and the stem is provided by respective O-rings.

To prevent the air pressure in the space above the diaphragm due to changes of temperature and displacement of the diaphragm from opposing the pressure below the diaphragm, the wall of the housing above the diaphragm may be provided with an automatic bleeder valve 22. However, this is not indispensable if one disregards variations in pressure caused by the air trapped above the diaphragm.

A throttle valve housing 23 includes a high pressure chamber 24 with a high pressure inlet port 25 for connection to a non-illustrated high pressure system, and a low pressure chamber 26 with a low pressure outlet port 27 for connection to a non-illustrated low pressure system; arrows indicate the direction of flow through the housing 23. An intermediate wall 28 separates the chambers 24 and 26, and is provided with a valve seat 29 defining an opening therethrough. A valve element 30 is placed within the housing 23 in alignment with the valve seat 29, and includes a valve spindle 31, which extends through a bore in the outer wall of the housing 23 for being actuated by the stem 12 of the pressure regulator to move a valve element 30 towards or away from its closing position. The pressure regulator is shown threaded into a socket formed in the housing 23.

A regulator pressure chamber 33, defined within the regulator housing 23 below the diaphragm 11, is connected to the low pressure chamber 26 by means of a tube 32. Secured to a central part of the diaphragm 11 is a rigid member 34.

Under normal operations, if the pressure in chamber 26 increases above a value preset by means of spring member 13, the pressure in the chamber 33 will also increase and move the diaphragm 11 and the rigid member 34 upwards, thereby lifting the stem 12 and the valve spindle 31, and cause the valve element 30 to move towards its closed position, thus throttling down the flow rate through valve seat 29, and thereby decreasing pressure in the chamber 26 until equilibrium is obtained at a preset outlet pressure.

When the pressure in chamber 26 decreases below the preset value, the parts will function in reverse to that manner explained above, and open the throttle valve further until the pressure in chamber 26 again has reached the preset value.

Operating in the case of failure or leakage of the diaphragm 11, the pressurized fluid enters through leakage in the diaphragm 11 from the chamber 33 into the closed chamber above the diaphragm 11, and urges the piston 18 upwards against the force of the spring 19. Upon abutment of piston 18 against the lock ring 16 on stem 12, the stem 12, the spindle 31 and the valve element 30 are carried along in the upward movement of piston 18, thereby moving the valve element 30 towards its closed position and reducing pressure in chamber 26 until equilibrium has been obtained between pressure forces acting against the lower surface of piston 18, and forces from spring means 17 and 19 acting against the top side of the piston 18.

In this situation the secondary regulating means will act upon variations of the output pressure in chamber 26 in a similar manner as explained above in connection with the primary regulating means, i.e., if the output pressure decreases, the valve element 30 will be moved away from its closed position, thereby increasing the pressure in chamber 26 until equilibrium has been reached again, and vice versa if the output pressure decreases.

Thus, a tolerably constant output pressure independent of variations of the input pressure, and thereby a constant flow rate through a low pressure system may be obtained.

The slide member or safety piston may advantageously be of a material to which the rubber O-rings will not adhere, such as plastic.

The safety slide member may be replaced in principle by a diaphragm or metal bellows so long as the stem is allowed freedom of movement through the diaphragm or the bottom of the bellows during normal operation.

While there has been shown what is considered to be the preferred embodiment of the invention, it will be obvious that modifications may be made which come within the scope of the disclosure of the specification.

It will thus readily be understood that the throttle valve may be of any convenient type other than the type illustrated, e.g. a butterfly valve or a needle valve.

What is claimed is:

1. In a throttle valve comprising a valve housing having a high pressure chamber with a high pressure inlet port and a low pressure chamber with a low pressure outlet port, a wall having a valve seat therein separating said high and low pressure chambers, a valve element comprising a valve spindle positioned in said valve housing, said valve spindle extending movably through the outer wall thereof for movement of said valve element in a direction towards and away from abutment against said valve seat by means of a pressure regulator acting against the outer end of said spindle, said pressure regulator comprising first and second housing parts sealingly separated from each other by a diaphragm, the second housing part and said diaphragm defining a regulator pressure chamber being connected through adequate tubing to the low pressure chamber of said throttle valve, said diaphragm having secured thereto and placed centrally thereof a rigid member being biased by a preselected spring force acting against the force exerted upon said diaphragm by the pressure in said regulator pressure chamber so as to define a balanced axial position of said rigid member within said regulator housing in response to the actual pressure within said regulator pressure chamber, a stem mounted to slide axially in said first housing part for abutment with its outer end against the outer end of said valve spindle and with its inner end against said rigid member and being relatively slightly biased by a spring force thereagainst, the improvement comprising a slide member mounted in said first housing part for sliding movement in a generally axial direction thereof in sealing contact around said stem and against the surrounding portions of said first housing part so as to define a generally closed chamber together with said diaphragm and situated on the side thereof opposite said regulator pressure chamber, first abutment means provided on said first housing part, said slide member being in its normal position under normal operational conditions of said pressure regulator relatively slightly biased against said first abutment means, said stem extending slidably through a central bore in said slide member and having in the normal position of said slide member spaced outside thereof second abutment means adapted to engage against said slide member when the latter during failure of said diaphragm is moved away from its normal position by fluid pressure acting thereon, so as to move said stem and thereby said valve element against its closed position.

2. The improvement according to claim 1, wherein said spring means biasing said stem against said rigid member as well as said spring means biasing said slide member against said abutment means in its normal position has such preselected characteristics that when compressed upon failure of said diaphragm it will exert a total spring force sufficient to prevent the movement of said valve element to its completely closed position.

3. The improvement according to claim 2, wherein at least one of said spring means is adjustable.

* * * * *